United States Patent

[11] 3,589,259

| | | |
|---|---|---|
| [72] | Inventor | Tadayuki Imai<br>Tokyo, Japan |
| [21] | Appl. No. | 783,978 |
| [22] | Filed | Dec. 16, 1968 |
| [45] | Patented | June 29, 1971 |
| [73] | Assignee | Kabushiki Kaisha Ricoh<br>Tokyo, Japan |
| [32] | Priority | Dec. 23, 1967 |
| [33] | | Japan |
| [31] | | 42/107801 |

[54] APERTURE CONTROL MECHANISM FOR PHOTOGRAPHIC TAKING LENS SYSTEM
1 Claim, 3 Drawing Figs.

[52] U.S. Cl. ................................................. 95/64
[51] Int. Cl. ................................................. G03b 9/06
[50] Field of Search ........................................ 95/64, 64 B

[56] References Cited
UNITED STATES PATENTS

| 2,222,298 | 11/1940 | Nerwin | 95/64 (B) |
| 3,466,994 | 9/1969 | Holderbaum | 95/64 (B) |
| 3,464,340 | 9/1969 | Maitani | 95/64 (B) |

Primary Examiner—Samuel S. Matthews
Assistant Examiner—Joseph F. Peters, Jr.
Attorney—Burgess, Ryan & Hicks ABSTRACT: An aperture control mechanism for a photographic taking lens system wherein a cam ring is provided with an automatic and manual aperture setting cam slots both of which are adjacent to and continuous with each other and which serve to control the range of angle of rotation of an aperture control lever for closing an aperture blade; and the cam ring is interlocked with an aperture setting ring, whereby automatic and manual aperture index scale regions can be disposed adjacent to each other upon the aperture setting ring.

PATENTED JUN29 1971

3,589,259

INVENTOR
Tadayuki Imai
BY Burgess, Ryan & Hicks
ATTORNEYS 3,589,259

APERTURE CONTROL MECHANISM FOR PHOTOGRAPHIC TAKING LENS SYSTEM

BACKGROUND OF THE INVENTION

The present invention relates to an aperture control mechanism for a photographic taking lens system and more particularly an aperture control mechanism for a photographic taking lens system which is operable automatically and manually.

There have been proposed various so-called automatic aperture control mechanisms for photographic cameras in which for example an actuator is extended beyond the rear end of a taking lens system for a single lens reflex camera in such a manner that the actuator is slidable or rockable and is interconnected to an actuating mechanism disposed in the camera body. When a subject to be photographed is focused, the aperture is maintained wide open while the automatic aperture control mechanism is actuated immediately prior to the release of the shutter in response to the shutter release operation during photographing thereby closing the aperture to a predetermined value and after photographed the actuator is released so as to set the aperture to the wide opened position. However, some of the automatic aperture control mechanisms of the type described above are not provided with manual aperture setting mechanisms, and others are provided with manual aperture setting mechanism. Also automatic and an manual aperture index scale regions to which the aperture setting ring of the camera will be set are spaced apart from each other by a considerable distance so that the rapid switching from automatic aperture setting to manual setting and vice versa is difficult and moreover, their constructions are complicated so that the mechanisms are easily susceptible to breakdown.

In view of the above, one of the objects of the present invention is to eliminate the defects encountered in the conventional aperture control mechanism and to provide an aperture control mechanism in which an automatic and a manual aperture index scale regions can be disposed adjacent to each other upon an aperture setting ring.

Another object of the present invention is to provide the aperture control mechanism of the type described by use of simple construction.

SUMMARY OF THE INVENTION

The present invention provides an aperture control mechanism simple in construction in which a cam ring is provided with an automatic aperture setting cam slot and a manual aperture setting cam slot which is formed immediately adjacent to and continuous with the automatic aperture setting slot, both of said cam slots being adapted to selectively control the movement of an aperture control lever which is adapted to actuate an aperture control ring so as to close or open an aperture blade. The cam ring is interlocked with an aperture setting ring, whereby an automatic aperture index scale region can be disposed adjacent to a manual aperture index scale region, thereby facilitating the rapid automatic and manual aperture setting as well as the switching to manual setting from automatic setting and vice versa.

Other objects and advantages of the present invention will become apparent from the following description of a preferred embodiment thereof taken in conjunction with the accompanying drawing.

DESCRIPTION OF THE PREFERRED EMBODIMENTS

Figure 3:
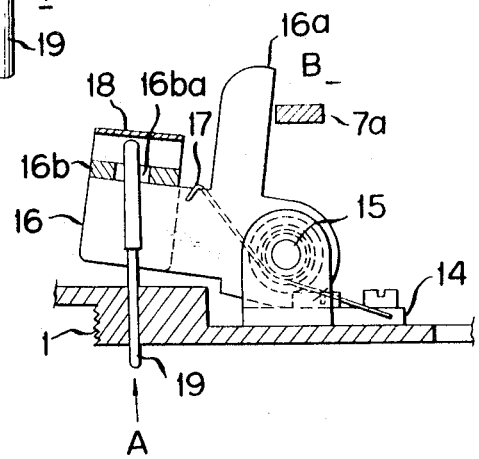
FIG. 3 is a sectional view taken along the line III—III of FIG. 1.

Around the outer and inner peripheries of a lens barrel 1 are fitted rotatably an aperture setting ring 2 and a cam ring 3 respectively both of which are drivingly cooperable with each other. In the cam ring 3 are provided an automatic aperture setting cam slot 4 and a manual aperture setting cam slot 5 adjacent to and continuous with the automatic aperture setting cam slot 4. A pin 8 which is secured to an aperture control lever 7 which in turn is rotatably pivoted to the lens barrel 1 by means of a pivot 6 is adapted to be fitted into or engage with both of the cam slots 4 and 5. An aperture control ring 10 which rotates about the optical axis of the taking lens system is adapted to close and open an aperture blade 9, and a pin 11 secured to the aperture control ring 10 is in engagement with a slot 12 formed at one end of the aperture control lever 7. When the pin 8 is in contact with the inner edge of the cam slot 4, the aperture is fully wide open at any position of the pin. When the pin 8 is out of contact with the inner edge of the cam slot 4 and is in contact with the outer edge of the cam slot 4, the aperture control ring 10 is rotated by a distance corresponding to the distance of displacement of the pin 8 permitted at the position thereof so that the aperture blade 9 is closed to a predetermined magnitude. When the pin 8 is engaged with cam slot 5, the pin 8 is held between the inner and outer edges of the cam slot 5 so that a desired aperture is obtained by the aperture blade 9 depending upon the position of the pin in the cam slot 5. An arm 7a is formed at the other end of the aperture control lever 7 and is loaded with a spring 13 so that the aperture control lever 7 is normally biased in the counterclockwise direction (See FIG. 1), whereby the pin 8 is normally in engagement with the inner side edge of the cam slot 4 or 5. An intermediate lever 16 is rotatably pivoted by means of a pivot 15 to a securing element 14 which in turn is securely fixed to the lens barrel 1 and is loaded with a spring 17 so as to be normally biased on the counterclockwise direction (See FIG. 3). The intermediate lever 16 is provided with a projecting arm 16a and a bent arm 16b which is bent substantially perpendicular to the free end of the lever 16. The arm 7a of the aperture control lever 7 is in contact with the inner edge of the projecting arm 16a of the lever 16. The bent arm 16b is provided with a through bore 16ba and the base portion of a plate spring 18 is attached to the side surface of the base portion of the bent arm 16b and is folded over the upper surface of the bent arm 16b in superposed relation therewith. An actuator 19 in the form of a rod is slidably disposed to the lens barrel 1, and one end of the actuator 19 extends through the through bore 16ba and is in engagement with the plate spring 18. The other end of the actuator 19 extends from rear surface of the lens barrel 1.

Figure 1:
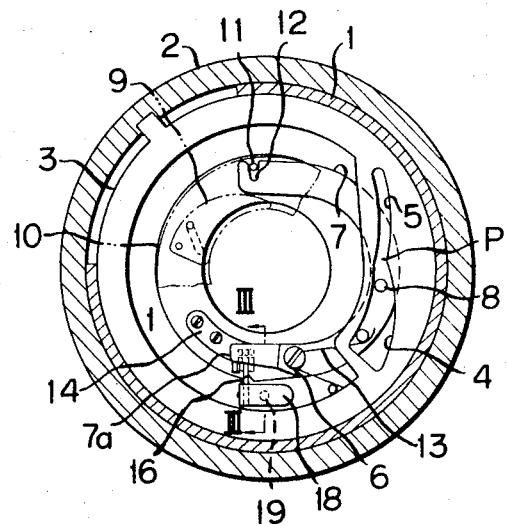
FIG. 1 is a traverse sectional view of an automatic and manual aperture control mechanism for a photographic taking lens system.
Figure 2:
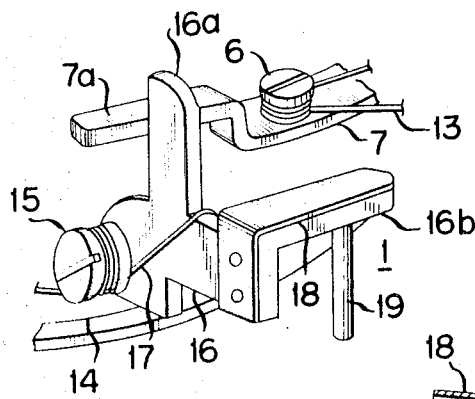
FIG. 2 is an enlarged schematic perspective view illustrating an intermediate lever member of the mechanism.

A taking lens system incorporated with an automatic and manual aperture control mechanism having the construction as described hereinabove is attached to a camera body. A desired so called preset aperture is set by rotating the aperture setting ring 2. For example, when the pin 8 of the aperture control lever 7 is positioned at a position as shown in FIG. 1 in the cam slot 4, the projecting end of the actuator 19 is pushed toward the direction indicated by the arrow A by the interlocking member (not shown) on the side of the camera body just prior to the shutter release so that the actuator 19 causes the intermediate lever 16 to rotate in the clockwise direction (See FIG. 3) against the spring 17. When the intermediate lever 16 pushes the arm 7a in the direction indicated by the arrow B, the aperture control lever 7 is rotated in the clockwise direction (See FIG. 1) until the pin 8 which has disengaged from the inner edge of the cam slot 4 contacts with the outer edge of the cam slot 4. In response to the rotation of the aperture control lever 7, the aperture control ring 10 is rotated so that the aperture blade 9 is closed to a present value or magnitude.

In this case, regardless of the preset value of the aperture, the sliding movement of the actuator 19 causes the pin 8 in the cam slot 4 to displace by the maximum distance so that the aperture control lever 7 is rotated only for the minimum aperture setting. Therefore, when the pin 8 is positioned at a position other than the minimum aperture setting position, the engagement of the pin 8 with the outer edge of the cam slot 4 prevents the rotation of the aperture control lever 7. Simultaneously, the rotation of the intermediate lever 16 is stopped so that the excess motion of the actuator can be absorbed by bending the plate spring 18.

When upon releasing the shutter the force applied to the actuator 19 is relieved, the plate spring 18 returns to its initial position by its own returning force. Simultaneously, the intermediate lever 16 is returned to its normal position by the spring 17 so that the aperture control lever 7 is again rotated whereby the pin 8 engages with the inner edge of the cam slot 4, thereby driving the aperture control ring 10 so as to open wide the aperture blade 9 as shown in FIG. 1.

When the aperture setting ring 2 is rotated toward the manual aperture setting region so that the pin 8 is guided into the cam slot 5 from the cam slot 4 passing beyond the boundary point P so as to set to a desired aperture, the pin 8 is then held in the cam slot 5 and moved by a predetermined distance radially of the lens barrel 1 against the spring 13 so that aperture control lever 7 is rotated through a predetermined angle. The aperture control ring 10 is accordingly rotated by the aperture control lever 7, thereby closing or setting the aperture blade 9 to a predetermined aperture value. In this case, when photographing, the interlocking member pushes the actuator 19, the operations of the actuator 19, the intermediate lever 16 and the spring 18 are the same as those when the above-described automatic aperture setting is made. The intermediate lever 16 will not push and drive the aperture control lever 7, but will engage with the lever 7 so that the rotation of the intermediate lever 16 is stopped.

As described hereinabove, according to the present invention, the aperture control lever 7 which rotates so as to drive or actuate the aperture control ring 10 is rotatably mounted by the pivot 6 to the lens barrel 1. The cam ring 3 is provided with the automatic aperture control cam slot 4 and the manual aperture control cam slot 5 which is formed immediately adjacent to and continuous with the automatic aperture control cam slot 4 both of which are adapted to engage with the aperture control lever 7 so as to determine the angle of rotation thereof and be interlocked with the aperture setting ring 2. The sliding motion of the actuator 19 is transmitted to the aperture lever 7 so as to rotate the lever 7. Therefore, even if the construction of the aperture control mechanism of the present invention is relatively simple, the automatic aperture setting region as well as the manual aperture setting region can be disposed adjacent to each other so that the automatic aperture setting operation can be rapidly switched to the manual aperture setting operation and vice versa and the aperture setting operation both automatically and manually can be made smoothly and accurately.

The present invention has been so far described with particular reference to a preferred embodiment thereof, but it will be understood that variations and modifications thereof can be effected within the spirit of the present invention as described hereinabove and as defined in the appended claim.

I claim:

1. An aperture control mechanism for a photographic (photography) taking lens system characterized by comprising
   an aperture control lever rotatably pivoted to a pivot securely fixed to a lens barrel;
   an aperture control ring adapted to be actuated by the rotation of said aperture control lever so as to close an aperture blade;
   a cam ring provided with cam slots for regulating the range of the displacement of a pin secured to said aperture control lever;
   an intermediate lever adapted to engage with an arm of said aperture control lever so as to impart the rotation to said aperture control lever; and
   an actuator adapted to rotate said intermediate lever,
   said cam slots comprising automatic aperture setting cam slot and a manual aperture setting cam slot which is formed adjacent to and continuous with said automatic aperture setting slot,
   said cam ring being interlocked with an aperture setting ring.